United States Patent
Wells

(10) Patent No.: US 11,364,668 B2
(45) Date of Patent: Jun. 21, 2022

(54) LOW HEAT BUILD-UP CAPSTOCK SYSTEM AND EXTRUSION TECHNOLOGY FOR SOLID AND FOAMED PROFILES IN DARK COLORS

(71) Applicant: Paul M. Wells, Edgewood, WA (US)

(72) Inventor: Paul M. Wells, Edgewood, WA (US)

(73) Assignee: Mikron Industries, Inc., Kent, WA (US)

( * ) Notice: Subject to any disclaimer, the term of this patent is extended or adjusted under 35 U.S.C. 154(b) by 0 days.

(21) Appl. No.: 16/732,075

(22) Filed: Dec. 31, 2019

(65) Prior Publication Data

US 2020/0282620 A1 Sep. 10, 2020

Related U.S. Application Data

(60) Continuation of application No. 13/135,484, filed on Jul. 5, 2011, now abandoned, which is a division of
(Continued)

(51) Int. Cl.
*B29C 48/29* (2019.01)
*B29C 48/07* (2019.01)
(Continued)

(52) U.S. Cl.
CPC .............. *B29C 48/29* (2019.02); *B29C 48/07* (2019.02); *B29C 48/09* (2019.02); *B29C 48/12* (2019.02); *B29C 48/13* (2019.02); *B29C 48/18* (2019.02); *B29C 48/90* (2019.02); *B29C 48/908* (2019.02); *B29C 48/91* (2019.02); *B29C 48/0012* (2019.02); *B29C 48/0022* (2019.02); *B29C 48/17* (2019.02); *B29C 48/2886* (2019.02); *B29C 48/355* (2019.02); *B29C 48/38* (2019.02);
(Continued)

(58) Field of Classification Search
CPC ......... B29C 48/29; B29C 48/18; B29C 48/07; B29C 48/09; B29C 48/12; B29C 48/13; B29C 48/90; B29C 48/91; B29C 48/908; B29C 48/0012; B29C 48/17; B29C 48/0022; B29C 48/38; B29C 48/355; B29C 48/904; B29C 48/913; B29C 48/2886; B29C 2035/046; B29C 2035/0822; B29C 2793/009; B29K 2105/16; B29K 2027/06; B29K 2055/02; B29K 2105/0005; B29K 2105/04; B29K 2311/10; B29K 2711/14; B29K 2995/003; B29L 2031/005; B29L 2031/10; B29L 2031/108; C08F 265/04; C08K 5/0041; C08K 3/013; C08L 51/003; C08L 51/04; C08L 55/02; C08L 69/00; C08J 5/00
See application file for complete search history.

(56) References Cited

U.S. PATENT DOCUMENTS 3,476,627 A * 11/1969 Herman ............ B32B 17/10761
264/173.16
4,100,325 A * 7/1978 Summers ................ B32B 27/08
428/334
(Continued)

*Primary Examiner* — Jeffrey M Wollschlager
(74) *Attorney, Agent, or Firm* — Fred Zollinger

(57) ABSTRACT

A weatherable, low heat build-up capstock system comprising an acrylic cap, a pigment system that is IR transparent to a greater degree than existing pigment systems, an IR reflective substrate, and an extrusion system for same.

18 Claims, 4 Drawing Sheets

Related U.S. Application Data application No. 11/291,494, filed on Dec. 1, 2005, now abandoned.

(60) Provisional application No. 60/632,754, filed on Dec. 1, 2004.

(51) Int. Cl.

| | |
|---|---|
| *B29C 48/09* | (2019.01) |
| *B29C 48/12* | (2019.01) |
| *B29C 48/13* | (2019.01) |
| *B29C 48/90* | (2019.01) |
| *B29C 48/91* | (2019.01) |
| *B29C 48/18* | (2019.01) |
| *B29C 48/00* | (2019.01) |
| *B29C 48/17* | (2019.01) |
| *B29C 48/38* | (2019.01) |
| *B29C 48/355* | (2019.01) |
| *B29C 48/88* | (2019.01) |
| *B29C 48/285* | (2019.01) |
| *B29C 35/04* | (2006.01) |
| *B29C 35/08* | (2006.01) |
| *B29K 27/06* | (2006.01) |
| *B29K 55/02* | (2006.01) |
| *B29K 105/00* | (2006.01) |
| *B29K 105/04* | (2006.01) |
| *B29K 311/10* | (2006.01) |
| *B29K 711/14* | (2006.01) |
| *B29L 31/00* | (2006.01) |
| *B29L 31/10* | (2006.01) |
| *B29K 105/16* | (2006.01) |

(52) U.S. Cl.
CPC .......... *B29C 48/904* (2019.02); *B29C 48/913* (2019.02); *B29C 2035/046* (2013.01); *B29C 2035/0822* (2013.01); *B29C 2793/009* (2013.01); *B29K 2027/06* (2013.01); *B29K 2055/02* (2013.01); *B29K 2105/0005* (2013.01); *B29K 2105/04* (2013.01); *B29K 2105/16* (2013.01); *B29K 2311/10* (2013.01); *B29K 2711/14* (2013.01); *B29K 2995/003* (2013.01); *B29L 2031/005* (2013.01); *B29L 2031/10* (2013.01); *B29L 2031/108* (2013.01)

(56) References Cited

U.S. PATENT DOCUMENTS

| | | | | |
|---|---|---|---|---|
| 4,110,062 | A | * | 8/1978 | Summers ................ B29C 48/12 425/71 |
| 5,866,054 | A | * | 2/1999 | Dorchester .......... B29C 48/175 264/75 |
| 2003/0030041 | A1 | * | 2/2003 | Genjima ................. B32B 27/20 252/587 |
| 2004/0096744 | A1 | * | 5/2004 | Sadamitsu ................. C08J 5/18 429/254 |
| 2004/0191540 | A1 | * | 9/2004 | Jakobi ................... G02B 5/208 428/457 |
| 2006/0125142 | A1 | * | 6/2006 | Kennedy ................. A61L 17/12 264/176.1 |

\* cited by examiner ant color. Thus, the color of the window frame and sash could be chosen to accent or contrast with the color of the exterior of the house. The PVC products are typically available only in white or beige. Understandably, window and door profiles in dark colors, such as "Hunter Green" and "Bronze," have long been demanded in the industry. Still, there is the significant issue of heat build-up, which largely accounts for the relative lack of dark colors in PVC windows and other products formed of extruded plastic lineals.

LOW HEAT BUILD-UP CAPSTOCK SYSTEM AND EXTRUSION TECHNOLOGY FOR SOLID AND FOAMED PROFILES IN DARK COLORS

CROSS REFERENCE TO RELATED APPLICATIONS

This application is a continuation application claiming priority to U.S. application Ser. No. 13/135,484 filed Jul. 5, 2011, which is a divisional application claiming priority to U.S. application Ser. No. 11/291,494 filed Dec. 1, 2005, which claims the benefit of U.S. Provisional Patent Application No. 60/632,754 filed Dec. 1, 2004; the disclosures of each are incorporated herein by reference.

TECHNICAL FIELD

The invention concerns extruded plastic profiles with a low heat build-up, weatherable capstock and the method and apparatus for extruding such products in hollow or foamed vinyl profile.

BACKGROUND OF THE INVENTION

Milled wood products have formed the foundation for the fenestration, decking, venetian blinds, shutters, decking and remodeling industries for many years. Historically, ponderosa pine, fir, red wood, cedar and other coniferous varieties of soft woods have been employed with respect to the manufacture of residential window frames, residential siding, outer decking and exterior shutters as well as interior venetian blinds and shutters. Wood products of this type inherently possess the advantageous characteristics of high flexural modulus, good screw retention, easy workability (e.g., milling, cutting), easy paintability, and for many years, low cost. Conversely, wood products of this type have also suffered from poor weatherability in harsh climates potential insect infestation such as by termites, and high thermal conductivity. In addition, virgin wood resources have become scarce causing correspondingly high material costs.

In response to the above described disadvantages of milled wood products, the fenestration industry, in particular, adopted polyvinyl chloride (PVC) as a raw material. Hollow, lineal extrusions manufactured into window frames became an enormous success, particularly at the lower end of the price spectrum. The window frames made from hollow PVC lineals (often referred to as "vinyl windows") have exhibited superior thermal conductivity, water absorption resistance, rot and insect resistance compared to painted ponderosa pine. Although such extrusions further enjoyed a significant cost advantage over comparable milled wood products, these PVC products had a significantly lower flexural modulus and higher coefficient of thermal expansion and were difficult to paint effectively. Similarly, hollow PVC lineals have replaced wood for Venetian blind and shutter frames, slats and related components having largely the same advantages and disadvantages as PVC window extrusions. Also, foamed polymer solid extrusions have been used to replace wood window frames and sashes, Venetian blind and shutter frames and slats. The foamed polymer extrusions may contain organic or inorganic fillers, such as wood flour and talc, respectively, where advantageous for improved physical properties such as stiffness and/or to reduce the cost of the extrusions.

As noted above, windows manufactured with wooden frames and sashes can easily be stained or painted virtually any color. Thus, the color of the window frame and sash could be chosen to accent or contrast with the color of the exterior of the house. The PVC products are typically available only in white or beige. Understandably, window and door profiles in dark colors, such as "Hunter Green" and "Bronze," have long been demanded in the industry. Still, there is the significant issue of heat build-up, which largely accounts for the relative lack of dark colors in PVC windows and other products formed of extruded plastic lineals.

When referring to dark colors herein, the inventor is referring generally to colors with an Lh value between 13 and 40. For example, per ASTM 4726-02, dark brown is defined as a color with an Lh between 13 and 33, an ah between −1.0 and 6.0 and a bh between 1.0 and 6.5. Per AAMA 308-02, dark green is defined as a color with an Lh between 20 and 40, and ah between −20 and −2 and a bh between −2.0 and 4.0. The inventor defines the color red to have Lh values between 20 and 30, ah values between 13 and 23, and bh values between 6 and 12.

For example, it is well known in the vinyl window industry that PVC window frames will fail in unacceptably high numbers, exhibiting symptoms such as buckling, warping and sagging, if the window frames become too hot. The environmental factors typically causing a window frame to warm is a high ambient air temperature in addition to visible light and near infrared solar radiation. It can be shown that ASTM D4803, Predicted Heat Build-Up, is a good predictor of product performance related to heat induced PVC window failure. That is, it is known to the inventor what products have failed in the field, what products have not failed in the field, and what the ASTM D4803 predicted heat build-up values are for those products. It is known that the near infrared portion of solar radiation is a significant portion of the energy radiated from the sun and the properties of a pigment system related to this spectrum will effect what is known as the heat build-up of that pigment system.

In order to color an extrusion or a capstock resin for application on an extrusion, various pigments are combined, typically by a color house, within a base resin where individual pigments absorb or reflect certain portions of the visible light spectrum causing the base resin to appear to be a certain predetermined color. Still, pigment systems that are the same color may have substantially different heat build-up characteristics as the near infrared portion of solar radiation is a significant portion of the energy radiated from the sun and the near infrared portion of solar radiation is invisible to the human eye.

In general, the art of coatings, capstocks, laminates, and mono-color extrusion has been concerned with using highly IR reflective pigment systems. Even state-of-the-art IR reflective pigment systems still limit the useful color spectrum to lighter shades, and darker colors using such state of the art pigment systems will lead to excessive heat build-up and, ultimately, product failure in the field. Thus, there is a need for dark colors that will not build up excessive heat and therefore fail at the point of use.

Applying a thin capstock layer to hollow vinyl profile and solid foamed polymer resin extrusion is well known in the art. Typically, the capstock layer is applied for the purpose of achieving color, weatherability, and certain appearance attributes in a cost-effective manner. Frequently, this allows the practitioner to use a lower-cost material in the substrate and therefore reduces total product cost. However, the useful color spectrum that can be applied to PVC hollow or foamed profile extrusion is limited to colors and pigment systems that do not build up excessive heat and thereby cause the body of the product to distort.

Other means to apply a layer of color to hollow vinyl profile and foamed vinyl extrusion include coatings and laminates. In general, both processes require a secondary operation after the hollow or foamed profile is extruded, and both processes are also limited in useful color spectrum due to heat build-up constraints. In addition, coating and laminate application typically requires the use of hazardous materials and is subject to various safety and environmental regulations. Coatings in particular are easily damaged during fabrication and installation and extensive touch-up is often required after the finished window or door unit is installed.

Last, mono-color extrusions are also common in the art. As with capstocks, coatings, and laminates, the useful color spectrum is limited to colors that do not readily absorb in the IR spectrum and therefore do not build up sufficient heat to distort the body of the extrusion. Typically, mono-color extrusions are seen in lighter shades and pastels where heat build-up is not a problem and where the required amount of pigments does not unduly increase the cost of the extrusion.

Thus, heretofore, dark colors such as Hunter Green and Bronze have been achieved only by using special coatings and laminates, and even then there are a limited number of suppliers of coatings and laminates that are suitable for exposure in demanding environments, such as Arizona, Nevada, and Southern California.

SUMMARY OF THE INVENTION

It is therefore an object of the invention to provide a heat build-up resistant extrudate with a dark-colored capstock which comprises an IR reflective substrate portion formed of a first thermoplastic resin that is substantially reflective of solar infrared radiation and a dark-colored capstock portion that is formed of a second thermoplastic resin that is significantly transmissive of solar infrared radiation and that covers at least a portion of the reflective substrate.

It is a further object of the invention to provide a method of producing a low heat build-up extrudate with a dark-colored capstock that comprises feeding of an IR reflective substrate formed of a first thermoplastic resin that is substantially reflective of solar infrared radiation into a first extruder, feeding a dark-colored capstock that is formed of a second thermoplastic resin that is significantly transmissive of solar infrared radiation into a second extruder and outputting the first and second extruders to an extrusion die that forms the extrudate into a predetermined shape where the dark-colored capstock covers at least a portion of the IR reflective substrate.

It is a still further object of the invention to provide for an extrusion line for the production of a low heat build-up extrudate with a dark-colored capstock which comprises a first extruder for extruding a first thermoplastic resin that is substantially reflective of solar infrared radiation, a second extruder for extruding a second thermoplastic resin that is significantly transmissive of solar infrared radiation, an extrusion die operatively coupled to the outputs of the first and second extruders wherein the extrusion die has upstream and downstream ends and forms the extrudate into a final extrudate of a predetermined profile at the downstream end that wherein the extrudate comprises an IR reflective substrate portion that covers at least a portion of the extrudate and that is formed of the first thermoplastic resin, and a dark-colored capstock portion that is formed of the second thermoplastic resin that covers at least a portion of the reflective substrate.

In a preferred embodiment of the inventive low heat build-up extrudate with a dark-colored capstock, the extrudate comprises an IR reflective substrate portion formed of a first thermoplastic resin that is substantially reflective of solar infrared radiation containing greater than about 8 parts titanium dioxide ($TiO_2$) per hundred parts base resin, a dark-colored capstock portion that is formed of a second thermoplastic resin that is less than about 30 thousandths of an inch thick and most preferably between 4 thousandths and about 8 thousandths of an inch thick, that is significantly transmissive of solar infrared radiation, and that covers at least a portion of the reflective substrate.

DETAILED DESCRIPTION OF THE PREFERRED EMBODIMENTS

Figure 1:
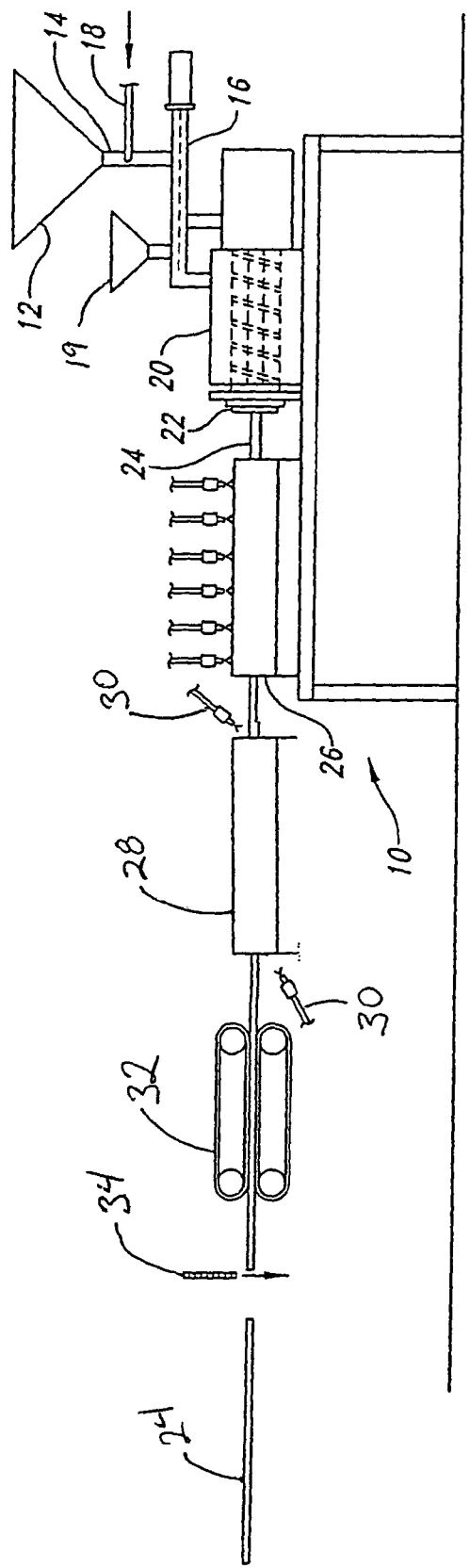
FIG. 1 is a plan view of an extrusion line of a type used with the inventive method.

The inventor and persons of ordinary skill in the art of extruding plastics for the fenestration industry understand that ASTM D 4803, Predicted Heat Build-Up, ASTM Standard Test Method for Predicting Heat Buildup in PVC Building Products (1997), is a good predictor of product performance as it relates to thermal failures due to excessive temperatures within a structural extrusion from absorbing solar radiation primarily in the near-infrared spectrum (NIR). That is, it is known to the inventor what products have failed in the field, what products have not failed in the field, and what the ASTM D4803 predicted heat build-up (PHBU) values are for those products. ASTM D4803 gives a predicted heat build-up in degrees Fahrenheit above ambient, e.g., a PHBU of 50° F. would indicate a test specimen temperature that is 50° F. greater than test ambient air temperature. Usefully, it is possible to tailor an IR transparent color capstock system and IR reflective substrate for predicted heat build-up values that are either known or predicted to have acceptable performance in the field. The inventor is aware of significant numbers of heat build-up related failures of structural PVC fenestration components in use in the continental United States where the horizontal PHBU values were 59° F. and believes that a horizontal PHBU of 56° F. or less for a production PVC structural fenestration product would appropriately limit the likelihood of such failures. A PHBU of 56° F. or less may be appropriate for temperate regions not subject to high solar radiation. For products other than fenestration products, such as Venetian blinds and shutters, or where the base resin is more or less tolerant of increased temperatures, the acceptable heat build-up values could be increased or decreased for reasons well understood in the plastics extrusion industry in a manner further described hereinbelow. As is well understood by one of ordinary skill in the plastics extrusion arts, the heat resistance of a product can be increased by changes made to the base resin such as by the use of a heat resistant PVC. These prior art solutions can be used in combination with the present invention to allow a useable fenestration product where the horizontal PHBU values are higher than the values recommended above.

It should be understood that further reduction of the PHBU will decrease the likelihood of heat build-up related failures. Still, excessive resistance to heat build-up is of no value to an end user in that the only goal is to ensure that the fenestration product or other extruded product does not warp, buckle or sag in use. Therefore, cost increases entailed in lowering the PHBU value or by increasing the heat resistance of the base extrusion must be justified as significantly lessening the likelihood of product failure.

The present invention utilizes a dark colored capstock for color that is significantly NIR transparent rather than NIR reflective, and relies on an NIR reflective substrate for the NIR reflectance. In effect, this means at least a two-component system is necessary to impart both the color and low heat build-up properties. For extrusion of a preferred embodiment of the invention, namely a capstocked, hollow, thin-walled polyvinyl chloride resin based extrusion, two extruders are required, as in a typical capstocking operation long found in the prior art, where a primary extruder extrudes a hollow, thin-walled extrusion, preferably formed of PVC resin, and a secondary capstocking extruder extrudes dark-colored capstock over at least a portion of the surface of the base extrusion. Salient differences from the prior art is that this PVC substrate must be tailored for near infrared solar (NIR) reflectance and the dark-colored capstock must be substantially transmissive of NIR as is more thoroughly discussed below. Another preferred embodiment of the invention comprises a foamed Styrene-Acrylonitrile Copolymer (SAN) based wood composite base extruded by a base extruder or a foamed PVC based base extruded by the base extruder, an NIR reflective substrate layer formed by a first capstocking extruder, and a dark-colored capstock that is significantly transmissive of solar infrared radiation (NIR) is formed by a second capstocking extruder. A further embodiment would provide comprises a primary extruder that extrudes a hollow, thin-walled extrusion, preferably formed of PVC resin and not necessarily NIR reflective, an NIR reflective substrate layer formed by a first capstocking extruder, and a dark-colored capstock that is significantly transmissive of solar infrared radiation (NIR) is formed by a second capstocking extruder.

In addition to the various extruders discussed above, appropriate calibrators, pullers and saws are needed for the production of the above described inventive extrusions Additionally, stresses imparted during the extrusion calibration process will affect the apparent color of the pigment systems of the preferred embodiments. Thus, the present invention also embodies a means to eliminate those stresses, and therefore provide a consistent visual color, by applying heat after the product exits the extruder calibrator.

Tailoring the heat build-up performance of an extrusion is conducted by essentially three means. First, the thickness of the dark-colored capstock is manipulated to minimize IR absorbance as NIR initially passes through the dark-colored capstock and as it is reflected off of the substrate back through the dark-colored capstock. This manipulation must also be done in a manner that preserves the visual color of the capstock. Second, the substrate is manipulated to provide the requisite IR reflectance, most commonly by manipulating the loading of TiO2 but also with consideration of other substrate constituents. Third, the pigments in the dark-colored capstock required to impart particular colors should be optimized to minimize their absorbance of NIR. In practice, all three means must be optimized for a particular capstock/color/substrate combination to yield a functional final product.

A preferred and useful pigment and cap material combination for the dark colored capstock material is available from Lanier Color Company and can be shown to posses the IR and weatherability properties desired, namely that the pigment system is substantially transmissive of NIR and such a pigment system is used in the inventive examples discussed, hereinbelow. The body of the dark colored capstock is Kaneka Corporation's proprietary XM20, which is an extrusion grade acrylic. This acrylic has a melt index value between approximately 13 g/10 min. and 20 g/10 min. as tested using ASTM D1238 standard at 230° C. and 3.8 kg mass. This useful Lanier pigment system uses a black base pigment that provides a suitable base to which other pigments can be added to achieve a desired particular color or chroma (e.g., forest green or bronze) as is well understood by color houses and those of ordinary skill in the art. Individual pigments may be reflective or transmissive of NIR so long as, overall, the pigment system is substantially NIR transmissive. The preferred Lanier pigment system, or a substitute that is substantially NIR transparent, would be suitable for use in the present invention and would achieve the ends of the present invention. The dark colored capstock may be solid colors or may be formed into wood grains or other finishes with textured appearances. Further, touch-up paints that are substantially NIR transparent based on similar NIR transmissive pigment systems may be used to repair minor scratches or gaps in the dark colored capstock such as may occur at the corner welds in a window frame.

Suitable IR reflective substrates are available from various sources or may be custom blended depending on IR reflectivity requirements but typically can comprise a white outdoor suitable polymer such as extrusions suitable for exterior use in a high solar exposure environment. A preferred IR reflective substrate is bright white hollow PVC window lineals containing 9 parts $TiO_2$ per 100 parts base PVC resin (9 phr $TiO_2$) further including various additives, modifiers and process aids as is well understood in the art. The inventor believe that lineals currently used in residential window frames would likely be a suitable substrate for this invention although the substrate NIR reflective properties may be adjusted as further described hereinbelow. Further, various pastel PVC lineals, in such shades as almond and adobe, and PVC wood-grain colored lineals may be useful so long as the lineals are IR reflective.

A preferred embodiment of base extrudate to be coated with a NIR reflective capstock and then the dark colored capstock would comprise a foamed Styrene-Acrylonitrile Copolymer (SAN) based wood composite such as the formulation described in U.S. application Ser. No. 09/452,906, entitled "Wood Fiber Polymer Composite Extrusion and Method" where the amount of wood flour is reduced to approximately 2% wood flour by weight in the formulation. Alternatively, the wood flour can be replaced with 200-mesh talc powder with favorable results. Another preferred embodiment of the base extrudate would be a foamed PVC (with various additives, modifiers, process aids and blowing agents) base extruded by the base extruder. A further base extrudate would be a hollow PVC lineal that does not contain significant amounts of $TiO_2$ to reduce the base extrudate cost. A preferred IR reflective capstock would be a bright white PVC capstock with 10 phr $TiO_2$. Further, capstocks of various polymers in white and in various pastel colors, such as almond and adobe, or wood-grain colored capstocks may be used so long as the capstock is IR reflective.

TABLE 1

| Specimen Description | Cap Thickness | % Transmittance | | | |
|---|---|---|---|---|---|
| | | UV | VIS | NIR | Solar |
| Inventive Dark Cap 1 | 0.009" | 0.0 | 2.1 | 42.4 | 21.6 |
| Inventive Dark Cap 2 | 0.028" | 0.0 | 0.7 | 25.8 | 12.9 |

TABLE 1-continued

| Specimen Description | Cap Thickness | % Transmittance | | | |
|---|---|---|---|---|---|
| | | UV | VIS | NIR | Solar |
| Prior Art Dark Cap 1 | 0.007" | 0.0 | 0.0 | 4.4 | 2.2 |
| Prior Art Dark Cap 2 | 0.023" | 0.0 | 0.0 | 0.2 | 0.1 |

The difference between the process and extrusions disclosed herein and the prior art are aptly illustrated by the data of Table 1. Table 1 shows the results of testing performed in accordance with ASTM Standard Test Method E903 (1996) for Inventive Dark Caps 1 and 2 including the substantially NIR transmissive dark-colored capstock to be used with the inventive process and product of this patent application. Prior Art Dark Caps 1 and 2 show a representative prior art commercially available dark-colored capstock and were subject to the same tests. As can be readily seen, Inventive Dark Caps 1 and 2 allow 42.4% and 25.8%, respectively, of NIR to pass through them in this test. In contrast, Prior Art Dark Caps 1 and 2 allow only 4.4% and 0.2% to pass through. This test data illustrates the prior art approach to dark-colored capstocks; reflectance of NIR by dark color capstock was attempted and only 4.4% of NIR is not absorbed or reflected by the 0.007" thick specimen. In contrast, the Inventive Dark Caps 1 is 0.009" thick and neither absorbs nor reflects 42.4% of NIR but instead allows it to pass through. This invention provides for a highly NIR reflective substrate to deal with this NIR which passes through dark-colored capstock.

This data further illustrates another important concept to practicing this invention, namely the correlation between capstock thickness and the amount of NIR transmittance. Please note that a 0.009" thick sample transmits 42.4% of NIR while a 0.028" thick sample transmits only 25.8%. Since reflectance is dominated by the surface of the dark-colored capstock essentially meaning that the 42.4%-25.8%=16.6% of NIR that is not transmitted by the thicker 0.028" sample is absorbed by the dark-colored capstock causing increased heat build-up for thicker dark-colored capstocked extrusion of the present invention. This illustrates the importance of the first means for limiting heat build-up in the inventive process; namely the decreasing of the thickness of the dark-colored capstock to minimize NIR absorbance as NIR initially passes through the dark-colored capstock and as it is reflected off of the substrate back through the dark-colored capstock.

TABLE 2

| Samples Pressed on White Substrate | White Substrate TiO$_2$ Loading (PHR) | Cap Thickness (in.) | Percent NIR Reflectance | Percent Solar Reflectance |
|---|---|---|---|---|
| Inventive Dark Cap 3 (10 phr TiO$_2$ substrate) | 10 | 0.011 | 74.8 | 43.7 |
| Inventive Dark Cap 4 (12 phr TiO$_2$ substrate) | 12 | 0.009 | 76.8 | 44.7 |
| Inventive Dark Cap 5 (14 phr TiO$_2$ substrate) | 14 | 0.010 | 77.1 | 44.8 |
| Prior Art Dark Cap 3 (10 phr TiO$_2$ substrate) | 10 | 0.008 | 32.9 | 19.9 |
| Prior Art Dark Cap 4 (12 phr TiO$_2$ substrate) | 12 | 0.009 | 35.5 | 19.6 |
| Prior Art Dark Cap 5 (14 phr TiO$_2$ substrate) | 14 | 0.009 | 32.6 | 19.7 |

Table 2 shows data from embodiments of the present invention, Inventive Dark Cap 3, 4 and 5, compared to prior art products, Prior Art Dark Cap 3, 4 and 5, where the dark capstocks are of similar colors and are pressed onto white substrates having differing titanium dioxide (TiO$_2$) levels. Percent NIR reflectance was determined for the dark colored cap portions of each of the examples in Table 2. Table 2 illustrates the second consideration, namely that the substrate is manipulated to provide the requisite NIR reflectance and most commonly increased or decreased by manipulating the loading of TiO$_2$ with consideration of other substrate constituents. It should be noted that, as the TiO$_2$ level of the substrate in the inventive examples is increased, the percent NIR reflectance also increases. The TiO$_2$ level of Inventive Dark Cap 3 is 10 parts per hundred resin and the percent NIR reflectance is 74.8 percent. In Inventive Dark Cap 4 where the TiO$_2$ level is 12 parts per hundred resin the percent NIR reflectance is 76.8 percent. Further, Inventive Dark Cap 5, where the TiO$_2$ level is 14 parts per hundred resin, the percent NIR reflectance is 77.1 percent. Thus, by increasing the NIR reflectance of the substrate by increasing the TiO$_2$ level one can increase the percent NIR reflectance of an extrusion with the inventive dark colored capstock.

In contrast, the exemplary prior art, Prior Art Dark Cap 3, 4 and 5, do not appear to be effected in a significant way by the TiO$_2$ level as the Prior Art Cap 3, with 10 parts per hundred resin, and the Prior Art Cap 5, with 14 parts per hundred resin, have very similar percent NIR reflectance. One would not expect that the prior art dark cap would be affected by the NIR reflectance of the substrate as essentially all of the NIR is either reflected or absorbed by the prior art dark colored cap.

FIG. 1 illustrates an extrusion line 10 suitable for practicing the inventive process. An extrusion line suitable for use in an embodiment of the inventive process is disclosed in The extrusion line 10 consists of at least two extruders including primary extruder 20 that includes a feed hopper 12 that drops into a feed column 14 which further connects to a premixer 16. Port 18 also feeds into feed column 14 for the addition of micro ingredients such as a blowing agent. Alternatively, such micro ingredients can be added at hopper 19 directly into the premixer 16. The ingredients that reach Premixer 16 are fed directly into the mouth of primary extruder 20. A dark colored capstock extruder and, in a preferred embodiment, a substrate capstock extruder, having essentially these same features as described above for the primary extruder is further disclosed.

A multi-plate extrusion die 22 is further described below with reference FIG. 2, but multi-plate extrusion die 22 is operatively attached to the primary extruder 20 the output of the primary extruder 20. The extrusion is shown at reference numeral 24 after it has exited multi-plate extrusion die 22. Extrusion 24 then enters calibrator 26 which is of the ordinary type used in plastic profile extrusion and which includes sizer plates which form extrusion 24 into its final form and spray nozzles to cool and solidify extrusion 24.

After extrusion 24 exits calibrator 26, it enters heat treatment tube 28. Heat treatment tube 28 has formed of PVC pipe approximately three feet long and of a diameter to allow easy clearance for extrusion 24 to pass through it. Preferably, at the entrance and exits of heat treatment tube 28, leister heaters 30 blow hot air into the tube and over extrusion 24. Alternatively, the heat treatment tube 28 can also be served by an IR heating tube to heat the exterior surface of extrusion 24. Further, the leister heaters 30 could be replaced with heat guns, IR heaters, radiant heaters or other devices that would heat the interior of the heat treatment tube 28 and thereby heat the surface of extrusion 24. The heat treatment tube 28 could be replaced with just leister heaters 30 or their substitutes that were noted above should bow of extrusion 24 not be a significant concern. Extrusion 24 then continues on to puller 32 and saw 34 that are entirely conventional extrusion equipment long in use in the art.

The purpose for the heat treatment tube is to eliminate the occurrence of "streaking" in the color cap where upon inspection, there will be streak of a differing shade in a line traveling down the length of extrusion 24 and it should be understood that heat treatment tube 28 or its substitutes would not be needed should there be no color streaking. The inventor believes that this streaking is caused by stresses formed in the surface of the dark colored capstock by the calibration and cooling process which of necessity causes the surface of the dark colored cap to contact the interior surface of calibrator 26 and causes the part to cool most quickly on the surface and, more gradually, for the interior portions of the extrusion to cool relatively more slowly. This streaking most typically is of a red shade. The inventor has found that this streaking can be easily removed by heat treatment of the surface of dark colored capstock. Inventor has further found that use of the heat treatment tube, as described above, heats the entire surface of extrusion 24 thus avoiding causing extrusion 24 to bend or bow as can be caused by heating only one side of the extrusion such as by directly blowing hot air onto a surface of extrusion 24. Inventor has found that heating the surface of extrusion 24 to approximately 145° F. to 150° F. will remove the color streaking observed in the dark colored cap disclosed herein and has found that Leister heaters 30 blowing air at approximately 225° F. into the tube has raised the surface of examples of extrusion 24 to the desired 145° F. to 150° F.

Figure 2:
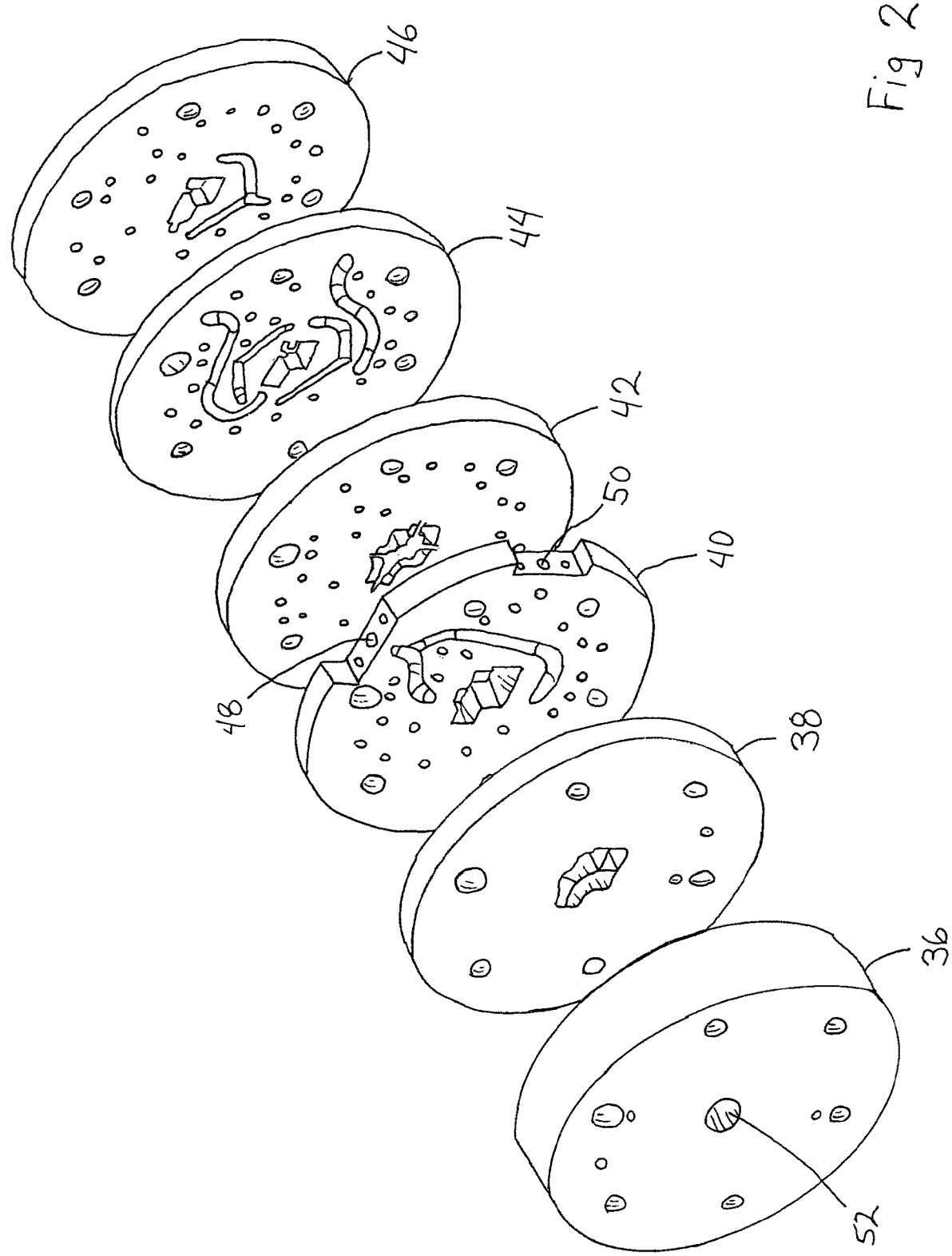
FIG. 2 is an exploded view of the upstream side of a multi-plate extrusion die for use in a preferred embodiment of the inventive method and with a preferred embodiment of the inventive extrusion line.
Figure 3:
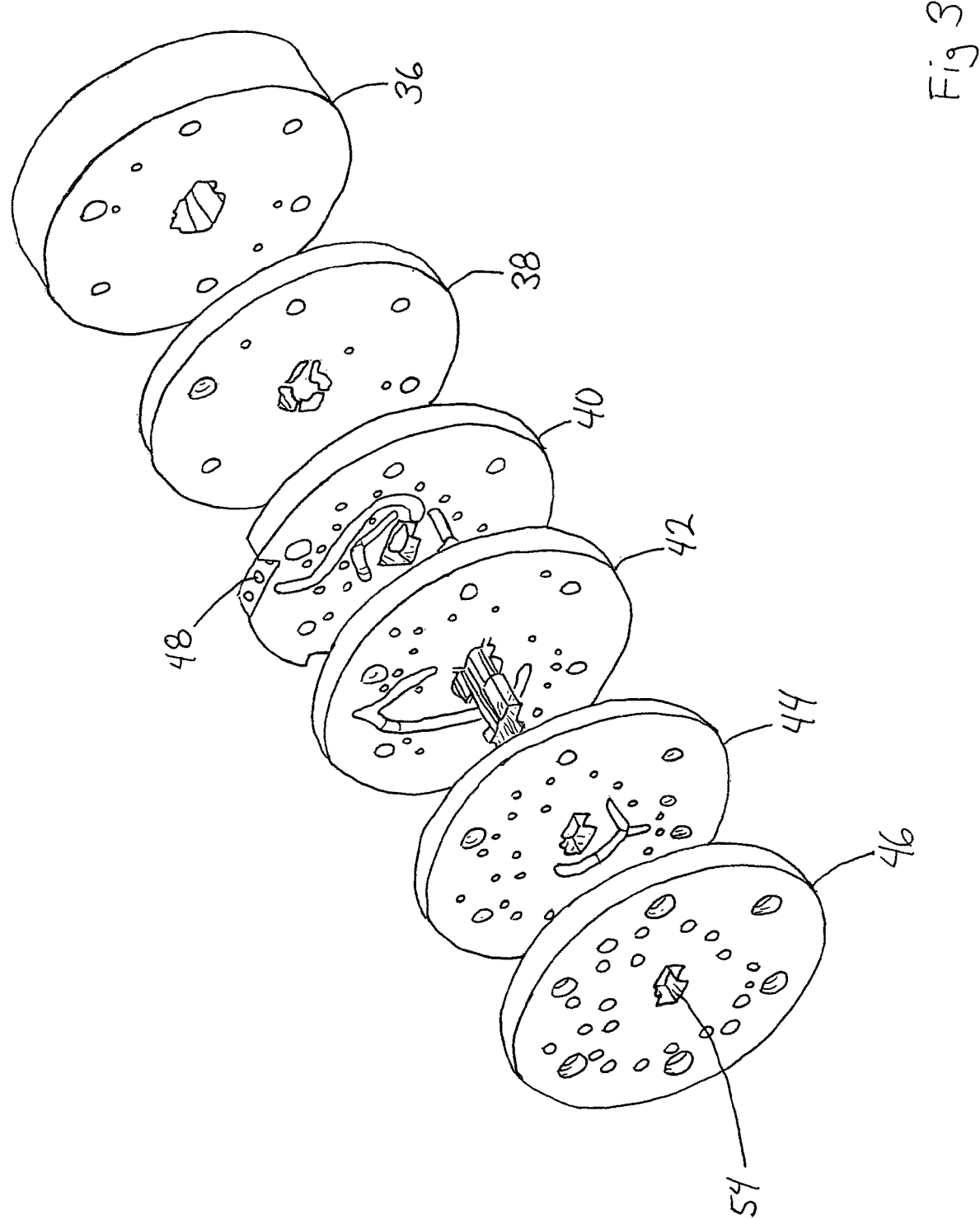
FIG. 3 is an exploded view of the downstream side of a multi-plate extrusion die for use in a preferred embodiment of the inventive method and with a preferred embodiment of the inventive extrusion line.

FIG. 2 is an exploded view of the upstream sides of the individual plates of the multi-plate extrusion die 22 for use in a preferred embodiment with a foamed primary extrudate FIG. 3 is an exploded view of the downstream side of a multi-plate extrusion die for use in a preferred embodiment of the inventive method and with a preferred embodiment of the inventive extrusion line.

FIGS. 2 and 3 illustrate a multi-plate die assembly 22 shown in exploded form consisting of individual die plates 36, 38, 40, 42, 44 and 46, for manufacturing an embodiment of the inventive heat build-up resistant extrudate with a dark-colored capstock. The manner of use of such dies is well known to those of ordinary skill in the thermoplastic extrusion art and is well described in U.S. patent application Ser. No. 09/452,906, entitled "Wood Fiber Polymer Composite Extrusion and Method" assigned to the assignee of the present invention. Disclosure of that application is incorporated herein by reference. Nevertheless, it is sufficient to state that the multi-plate die assembly 22 shown in FIGS. 2 and 3 is intended for use with a plurality of conventional extruders, such as conventional twin screw extruders, each of which includes a mixer or hopper for accepting a thermoplastic feed stock that may or may not include a filler such as wood flour, a conduit for connecting the hopper with a preheater for controlling the temperature of an admixture of the feed stock in the hopper, and optionally an inlet for introducing foaming agents in the case of a foamed component. The multi-screw chamber of each extruder is connected to an appropriate input on the die assembly plates shown in FIGS. 2 and 3 for producing an embodiment of the heat build-up resistant extrudate with a dark-colored capstock shown in FIG. 4.

Figure 4:
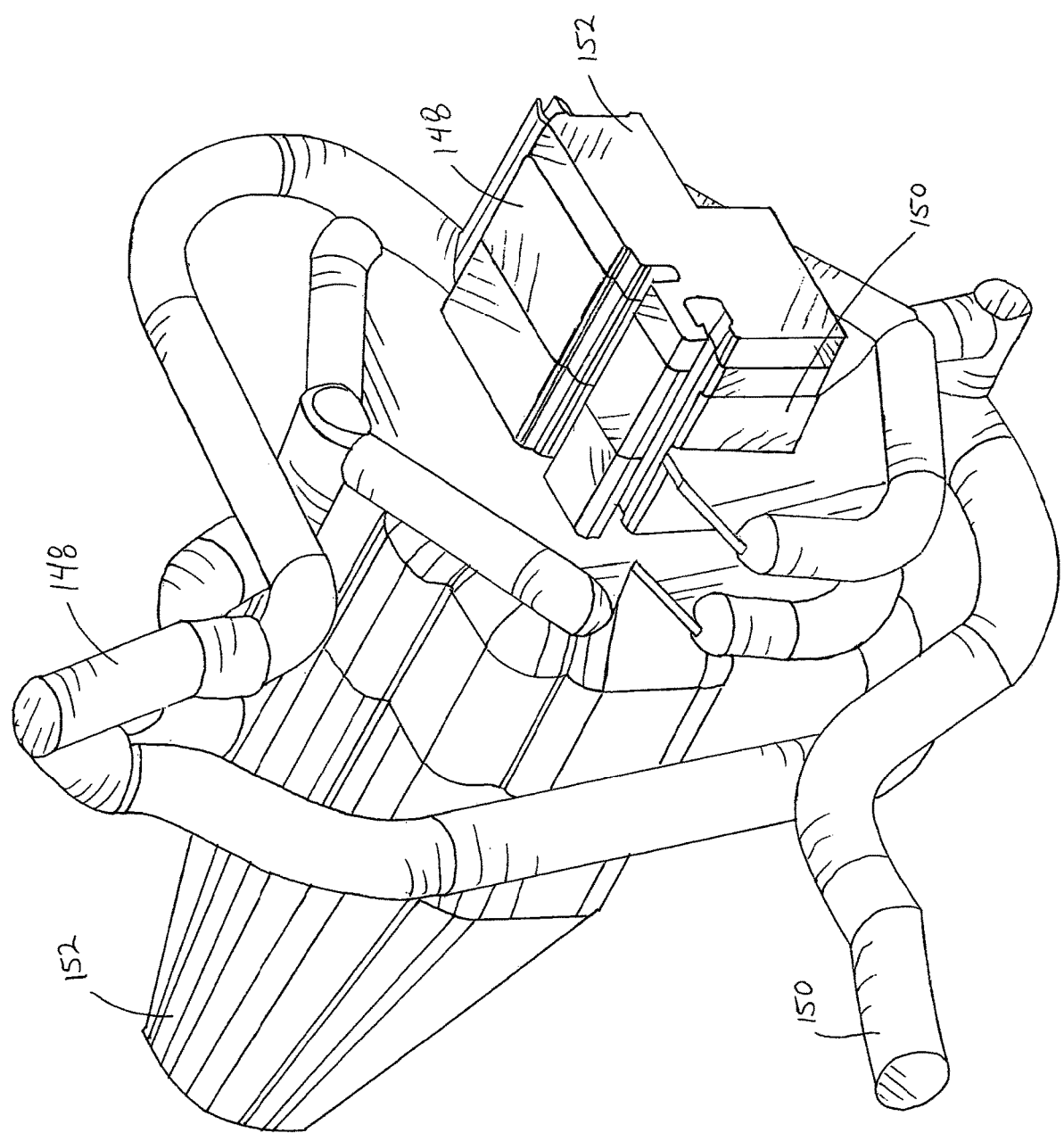
FIG. 4 is a view of a preferred embodiment of the inventive product and of the flow of thermoplastic materials through the multi-plate extrusion die of FIGS. 2 and 3.

As best seen in FIGS. 2 and 3, one of the hereinabove described extruders (not shown) is fluidly connected to an introductory plate 36 for introduction of a foamed primary extrudate through the multi-plate die assembly 22. FIGS. 2, 3 and 4 show a foamed primary extrudate but the invention may also be practiced with a hollow, thin-walled PVC resin or a hollow, thin-walled thermoplastic and wood flour composite. The embodiment shown in FIGS. 2, 3 and 4 contains a primary extrudate of foamed thermoplastic and preferably a foamed thermoplastic and wood composite material. Introductory plate 36 is fluidly connected to a transfer plate 38 which is fluidly connected to substrate capstocking plate 40, mandrel plate 42 and dark-colored capstocking plate 44 and then to exit plate 46. A substrate capstocking extruder is connected to substrate capstocking port 48 of capstocking plate 40 to provide an IR reflective substrate layer on the primary extrudate. A dark-colored capstocking extruder is connected to dark-colored capstocking port 50 of capstocking plate 40 to provide an IR reflective substrate layer on the primary extrudate. The mandrel plate 42 that supports a mandrel by means of a plurality of longitudinally elongated fins within a primary conduit that runs from primary aperture 52 connected to the primary extruder through to the exit aperture 54 which is substantially the desired shape the final profile. The profile would leave exit aperture 54 in substantially the final shape of the profile and enter calibrator 26. Visible in FIG. 3 is dark colored capstocking die 44 is fluidly connected to dark colored capstock port 50 and which applies the dark colored capstock over the substrate capstock.

The flow of the primary extrudate and the capstocking material within the capstocking conduits 48 and 50 can be readily seen in FIG. 4. FIG. 4 is a representation of the flow of the primary extrudate and the capstocking materials through the multi-plate die assembly 22 which is shown in exploded form in FIGS. 2 and 3. The flow of the primary extrudate is shown at reference numeral 152 and shows the flow of the primary extrudate that flows in from the primary extruder into primary aperture 52 shown in FIG. 2 and out of exit aperture 54 shown in FIG. 3. The substrate capstock flow 148 shows the flow of the NIR reflective substrate that flows from the substrate capstock extruder into substrate capstocking conduit 48 shown in FIGS. 2 and 3 to coat the primary extrudate. The dark-colored capstock flow 150 is shown as it flows through the multi-plate extrusion die 22 through dark-colored capstocking conduit 50 visible in FIG. 2 to coat the NIR reflective substrate capstock.

The invention claimed is:

1. A method of producing a fenestration extrudate comprising the steps of:
    forming a fenestration extrudate that is substantially reflective of solar infrared radiation; the fenestration extrudate being formed from a first thermoplastic resin having greater than about 8 parts $TiO_2$ per hundred parts resin;
    extruding a dark-colored capstock over a portion of the fenestration extrudate with a capstocking extruder to provide a capstocked fenestration extrudate; the dark-colored capstock having an Lh value between 13 and 40; the dark-colored capstock having a thickness of between 4 and 30 thousandths of an inch and being made with a second thermoplastic resin having pigments that are transmissive of solar infrared radiation; and
    wherein the capstocked fenestration extrudate exhibits a predicted horizontal heat build-up under ASTM D4803 of less than about 56 degrees Fahrenheit.

2. The method of claim 1, further comprising the steps of moving the capstocked fenestration extrudate into a heating tube having upstream and downstream ends and blowing hot air from a heater into at least one end of the heating tube such that the surface of the extrudate is heated.

3. The method of claim 2, further comprising the step of heating the extrudate until the surface temperature of the extrudate at the downstream end of the heating tube exceeds a temperature of 115 degrees Fahrenheit.

4. The method of claim 2, further comprising the step of heating the extrudate until the surface temperature of the extrudate at the downstream end of the heating tube exceeds a temperature of 145 degrees Fahrenheit.

5. The method of claim 1, further comprising the step of extruding the dark-colored capstock at a thickness of less than about 20 thousandths of an inch.

6. The method of claim 1, further comprising the step of extruding the dark-colored capstock at a thickness of less than about 10 thousandths of an inch.

7. The method of claim 1, further comprising the step of extruding the dark-colored capstock at a thickness of less than about 8 thousandths of an inch.

8. The method of claim 7, further comprising the step of forming the fenestration extrudate from a first thermoplastic resin having between 8 and 11 parts $TiO_2$ per hundred parts resin.

9. The method of claim 1, further comprising the step of forming the fenestration extrudate from a first thermoplastic resin having between 8 and 11 parts $TiO_2$ per hundred parts resin.

10. A method of producing a fenestration extrudate comprising the steps of:
    forming a fenestration extrudate;
    extruding an inner capstock onto the fenestration extrudate; the inner capstock being substantially reflective of solar infrared radiation; the inner capstock being formed from a first thermoplastic resin having greater than about 8 parts $TiO_2$ per hundred parts resin;
    extruding a dark-colored capstock over a portion of the inner capstock with a capstocking extruder to provide a capstocked fenestration extrudate; the dark-colored capstock having an Lh value between 13 and 40; the dark-colored capstock having a thickness of between 4 and 30 thousandths of an inch and being made with a second thermoplastic resin having pigments that are transmissive of solar infrared radiation; and
    wherein the capstocked fenestration extrudate exhibits a predicted horizontal heat build-up under ASTM D4803 of less than about 56 degrees Fahrenheit.

11. The method of claim 10, further comprising the steps of moving the capstocked fenestration extrudate into a heating tube having upstream and downstream ends and blowing hot air from a heater into at least one end of the heating tube such that the surface of the extrudate is heated.

12. The method of claim 11, further comprising the step of heating the extrudate until the surface temperature of the extrudate at the downstream end of the heating tube exceeds a temperature of 115 degrees Fahrenheit.

13. The method of claim 11, further comprising the step of heating the extrudate until the surface temperature of the extrudate at the downstream end of the heating tube exceeds a temperature of 145 degrees Fahrenheit.

14. The method of claim 10, further comprising the step of extruding the dark-colored capstock at a thickness of less than about 20 thousandths of an inch.

15. The method of claim 10, further comprising the step of extruding the dark-colored capstock at a thickness of less than about 10 thousandths of an inch.

16. The method of claim 10, further comprising the step of extruding the dark-colored capstock at a thickness of less than about 8 thousandths of an inch.

17. The method of claim 16, further comprising the step of forming the inner capstock from a first thermoplastic resin having between 8 and 11 parts $TiO_2$ per hundred parts resin.

18. The method of claim 10, further comprising the step of forming the inner capstock from a first thermoplastic resin having between 8 and 11 parts $TiO_2$ per hundred parts resin.

\* \* \* \* \*